United States Patent
Kojima et al.

(10) Patent No.: US 7,589,762 B2
(45) Date of Patent: Sep. 15, 2009

(54) IMAGE PROCESSING APPARATUS, IMAGE PROCESSING METHOD, AND COMPUTER PROGRAM

(75) Inventors: Hiroyuki Kojima, Kanagawa (JP); Takashi Hoshi, Tokyo (JP); Yuzo Murayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 10/525,340

(22) PCT Filed: Jul. 14, 2004

(86) PCT No.: PCT/JP2004/010039

§ 371 (c)(1), (2), (4) Date: Sep. 7, 2005

(87) PCT Pub. No.: WO2005/009032

PCT Pub. Date: Jan. 27, 2005

(65) Prior Publication Data

US 2006/0110139 A1     May 25, 2006

(30) Foreign Application Priority Data

Jul. 22, 2003    (JP)   ............................ 2003-277237

(51) Int. Cl.
*H04N 5/228* (2006.01)
*H04N 11/20* (2006.01)
(52) U.S. Cl. .................................... 348/222.1; 348/445
(58) Field of Classification Search ............. 348/222.1, 348/445, 443, 441, 558, 220.1, 578, 220, 348/559, 560; 386/33, 109
See application file for complete search history.

(56) References Cited

U.S. PATENT DOCUMENTS

| 5,428,454 | A | * | 6/1995 | Kimura et al. ............... 386/123 |
| 5,659,356 | A | * | 8/1997 | Asaida et al. ............ 348/222.1 |
| 5,801,772 | A | * | 9/1998 | Asaida et al. ............ 348/222.1 |
| 5,900,909 | A | * | 5/1999 | Parulski et al. ........... 348/231.6 |
| 5,914,754 | A | * | 6/1999 | Kori et al. .................... 348/455 |
| 5,956,092 | A | * | 9/1999 | Ebihara et al. .............. 348/445 |
| 6,229,574 | B1 | * | 5/2001 | Han ........................... 348/555 |
| 6,680,747 | B1 | * | 1/2004 | Hirose ..................... 348/220.1 |
| 2002/0027614 | A1 | * | 3/2002 | Konuma ..................... 348/558 |

FOREIGN PATENT DOCUMENTS

| EP | 0 716 545 A2 | 6/1993 |
| EP | 1 182 870 A1 | 2/2002 |

(Continued)

*Primary Examiner*—Nhan T Tran
*Assistant Examiner*—Amy Hsu
(74) *Attorney, Agent, or Firm*—Oblon, Spivak, McClelland, Maier & Neustadt, P.C.

(57) ABSTRACT

Video signals such as television reception signals are recorded in a suitable manner taking into consideration the use of external devices each having a different aspect ratio. The aspect ratio of an original video signal is converted so that the image has roundness of 1 and has the maximum size fitting in the particular screen reproducing the recorded video signal. Then, a background signal of a size the same as the screen size or a size needed for video combination is generated, and the result is added around the video signal to generate any desired video signal size. In such a manner, the recorded image has the aspect ratio matching that of the reproduced image.

16 Claims, 2 Drawing Sheets

FOREIGN PATENT DOCUMENTS

| | | |
|---|---|---|
| JP | 5-244562 | 9/1993 |
| JP | 5-292471 | 11/1993 |
| JP | 8-163516 | 6/1996 |
| JP | 2002-77767 | 3/2002 |
| JP | 2002-165178 | 6/2002 |
| JP | 2003-111054 | 4/2003 |

* cited by examiner

IMAGE PROCESSING APPARATUS, IMAGE PROCESSING METHOD, AND COMPUTER PROGRAM

TECHNICAL FIELD

The present invention relates to image processors and image processing methods, and computer programs for processing video signals such as television reception signals, and specifically, to an image processor and an image processing method, and a computer program for recording video signals such as television reception signals obtained using external devices.

Still more specifically, the present invention relates to an image processor and an image processing method, and a computer program for recording video signals such as television reception signals obtained using external devices varying in display format, and an image processor and an image processing method, and a computer program for recording video signals such as television reception signals obtained using external devices each having a different aspect ratio.

BACKGROUND ART

In the modern information society, broadcasting plays an immeasurably important role. Most of all, television broadcasting that directly offers viewers video information together with acoustic information has had a large impact. The broadcast technology covers a wide range of technology areas including signal processing, signal transmission and reception, and acoustic and video information processing. Moreover, transmission is carried out in various forms, including broadcast mode using radio waves such as ground waves and satellite waves and cable television mode, or one utilizing computer communications.

The ownership rate for television is considerably high, and almost every household has it. Broadcasts coming from broadcast stations are viewed and listened by an indefinite large number of people. Moreover, another manner of viewing broadcasts is recording received broadcasts whereby once they are recorded they can be viewed whenever desired.

For reproduction of the broadcast contents, conventionally used are VCRs and HDD recorders. On the other hand, there is a demand for reproducing recorded content on portable devices such as PDAs (Personal Digital Assistants), that is, at any suitable place at any preferred time for having fun. The problem here is that, however, the indication display provided in the portable devices of such a type has the different aspect ratio from that of a television receiver.

A viewer for reproducing the recorded contents on the portable devices does not generally have the mechanism for aspect ratio conversion. Thus, the image signal must be transferred to a device for adjustment of the aspect ratio before display on the portable device.

On the other hand, the VCRs and HDD recorders are basically so structured as to record incoming image signals with their the original aspect ratio. Moreover, reproducing video tapes on the portable devices is physically impossible, and with the HDD recorders, recording media themselves are nonremovable and thus cannot be carried around wherever desired. In view of this, to make possible viewing on the portable device, an external memory is considered suitable due to its smaller-size and lighter-weight for ease of carrying around.

What is more, with a conventional recorder, recording is carried out without information about video ID signals that has been superimposed on video signals at the time of recording. As a result, even if the mechanism of aspect ratio conversion is provided to the device for the display, no automatic conversion is available.

As an example, an information recording and reproducing system has been proposed which adjusts images to aspect ratio information (for example, refer to Patent Document 1). A proposal has been made to adjust according to the aspect ratio information when reproducing video signals read from recording media such as DVDs, but not to carry out the aspect ratio information adjustment when recording video signals in such recording media. In other words, if the video signals written onto the recording are not already compatible with the viewer of the portable device, they cannot be reproduced on the portable devices.

[Patent Document 1]
JP-A-2002-251830

DISCLOSURE OF THE INVENTION

An object of the present invention is to provide an image processor and an image processing method, and a computer program those are superior toothers, allowing recording of video signals such as television reception signals in a format suited obtained using external devices each having a different display format.

Another object of the present invention is to provide an image processor and an image processing method, and a computer program those are superior to others, allowing recording of video signals such as television reception signals obtained using external devices each having a different aspect ratio.

The present invention is proposed in consideration of the above-described objects. Its first aspect is an image processor for processing a video signal. The image processor is characterized in including:

aspect ratio information acquisition means for acquiring aspect ratio information about the original video signal;

aspect ratio conversion means for carrying out a process of aspect ratio conversion based on the acquired aspect ratio information in such a manner that the roundness of the original video signal becomes 1;

background signal generation means for generating a video signal serving as background of the video signal that is the main signal; and video signal combination means combining the video signal and background signal after both have been subjected to aspect ratio conversion.

Herein, the video signal resulting from signal combination is for example recorded onto a removable recording medium. Thereafter, the recording medium storing the video signal is loaded in an external device such as a portable terminal for reproduction, i.e., display output, of the recorded video signal using a dedicated viewing device, for example.

The aspect ratio conversion means carries out the aspect ratio conversion with respect to the original video signal recorded by the external device on a recording medium, in such a manner that an input image has roundness of 1 and is maximum in size within the screen that is selected, for example by pixel number conversion.

Then, the background signal generation means uses the same signal format as that for the video signals to be generated by the aspect ratio conversion means to generate a background signal of a size the same as the screen that is selected or a size needed for video combination, to reproduce the video signals recorded by the external device on the recording medium loaded therein. For example, the generated background comprises images derived by a program filling in a rectangular region, images created in the bitmap format or the JPEG (Joint Picture Experts Group) format, or a combination of these.

Lastly, in a case where the image after conversion has an aspect ratio different from the preset aspect ratio at the time of recording, the background signal is added around the video signal that is the main image so that the desired video signal size matching the preset aspect ratio is generated. In this manner, a recoding image having an aspect ratio suited for reproduction is generated.

Further, a second aspect of the present invention is directed to a computer program that is written in a computer-readable format to execute on a computer system a process of processing a video signal. The computer program is characterized in including:

- an aspect ratio information acquisition step of acquiring aspect ratio information about an original video signal;
- an aspect ratio conversion step of carrying out a process of aspect ratio conversion based on the acquired aspect ratio information in such a manner that the roundness of the original video signal becomes 1;
- a background signal generation step of generating a video signal serving as background of the video signal that is the main image; and
- a video signal combination step of executing a process of combining the video signal and a background signal which both have been subjected to aspect ratio conversion.

The computer program according to the second aspect of the present invention is defined as being a computer program that is written in a computer-readable format to realize a predetermined process on a computer system. In other words, by installing the computer program according to the second aspect of the present invention to a computer system, cooperative effects can be achieved by the computer system, thereby leading to operational effects similar to those derived by the image processor according to the first aspect of the present invention.

According to the present invention, an image processor and an image processing method and a computer program superior to others allow recording of video signals such as television reception signals in any suitable manner using external devices each having a different aspect ratio.

According to the present invention, the aspect ratio of a video signal is subjected to automatic conversion in such a manner that roundness of the image becomes 1. Therefore, even if no mechanism of aspect ratio conversion is provided in the device reproducing the image for display, display can be made in a correct manner.

These and other objects, features, and advantages of the present invention will become apparent from the following more detailed description of the present invention when taken in conjunction with an embodiment or the accompanying drawings.

BEST MODE FOR CARRYING OUT THE INVENTION

In the below, an embodiment of the present invention is described in detail by referring to the accompanying drawings.

Figure 1:
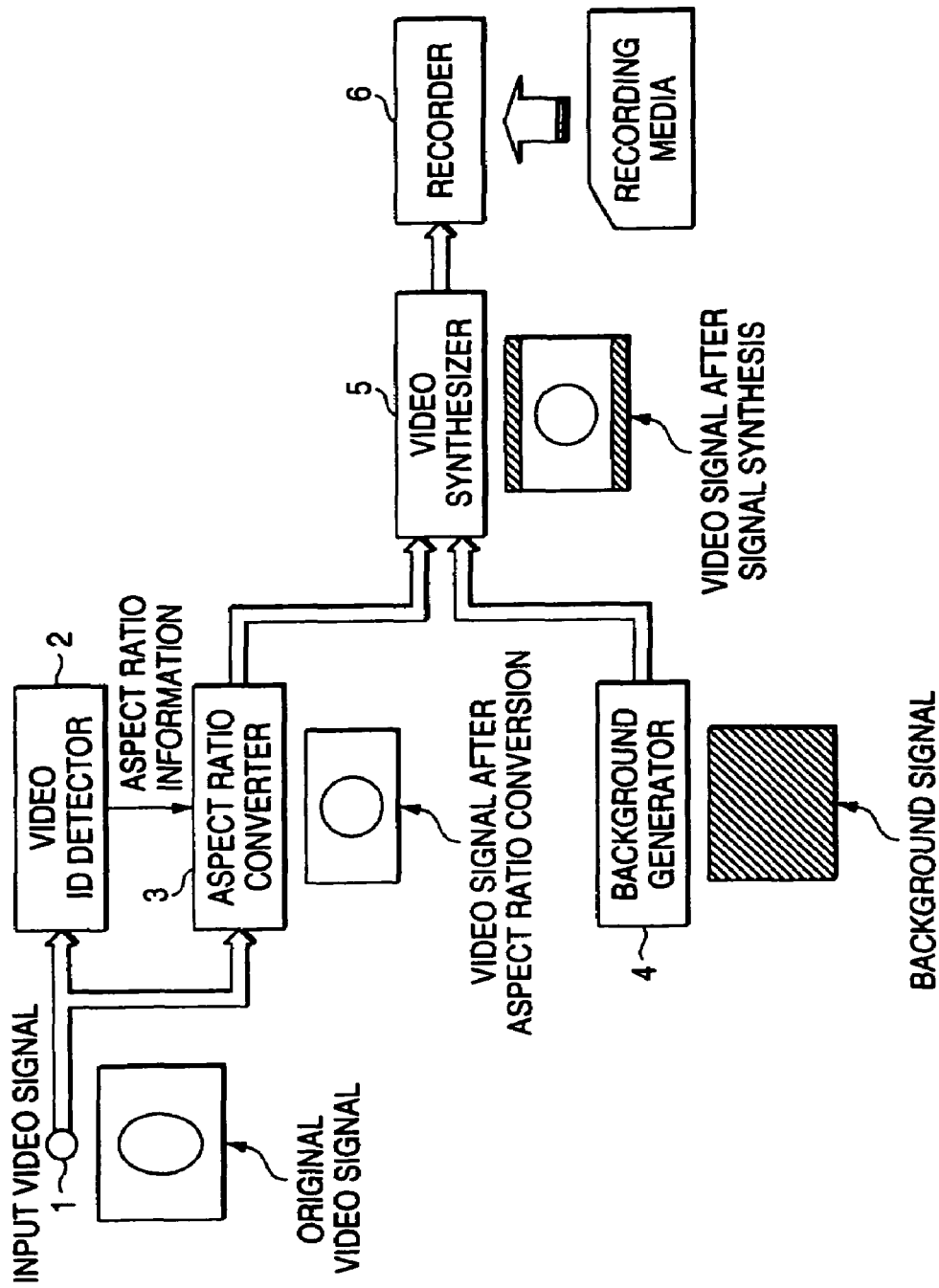
FIG. 1 is a diagram schematically showing the function structure of an image processor according to an embodiment of the present invention.

FIG. 1 schematically shows the function structure of an image processor according to the embodiment of the present invention. For example, the image processor is incorporated in devices including a television receiver, a set-top box, or others, for receiving television reception signals, or is applied through an external connection established with devices of such a type, and its input is a video signal such as a television reception signal. Note herein that such an input video signal is not restricted to a television signal, and a possible input may be a video signal that is reproduced from any other recording medium such as VCR or DVD, for example. The image processor of the present embodiment has a function of making a recording on a removable and easy-to-carry recording medium to perform display output on a viewer of a portable device, for example.

The image processor shown in the drawing is provided with a video ID detector 2, an aspect ratio converter 3, a background generator 4, a video synthesizer 5, and a recorder 6.

A video signal is input from an external device that is not shown to both the video ID detector 2 and the aspect ratio converter 3 via an input terminal 1. The video signal at the time of input as such does not necessarily have an image with roundness of 1.

The video ID detector 2 detects a video ID signal that has been superimposed on the input video signal, acquires aspect ratio information about the image that is input as the video signal, and forwards the result to the aspect ratio converter 3.

Based on the aspect ratio information, the aspect ratio converter 3 performs aspect ratio conversion with respect to the input image in such a manner that the resulting input image will the maximum size fitting in the selected screen, and has roundness of 1, and performs signal transmission to the video synthesizer 5 at the subsequent stage. The aspect ratio conversion is preferably performed in such a manner that the input image will be the maximum size but not oversized to fit the defined screen size, and has roundness of 1. Such a process of aspect ratio conversion is performed by a method such as pixel number conversion, for example. The pixel size after conversion is determined by the signal format when recording on the recording media in the recorder 6 and other factors.

The background generator 4 generates a video signal serving as background of a video signal that is the main image. In the present embodiment, generated is a background signal having the same size as the video signal to be recorded in the recorder 6 or a size needed for combination with the video signal. To be specific, such signal generation is performed using the same signal format as that for a video signal to be generated in the aspect ratio converter 3. Images derived by a program filling in a rectangular region, images created in the bitmap format or the JPEG (Joint Picture Experts Group) format, or a combination of these may be used.

The video synthesizer 5 goes through a process of synthesizing the video signal and the background signal which both have been subjected to aspect ratio conversion. With such a video combination process, the video signal to be recorded can be defined by size. In the present embodiment, in a case where the image after conversion performed in the aspect ratio converter 3 has an aspect ratio different from the preset aspect ratio at the time of recording (i.e., aspect ratio for reproducing on the portable device the recording medium recorded by the recorder 6), to match the two, a background signal is added around the video signal that is the main image so that an image having the desired aspect ratio is generated.

In the table below, the relationship between the video ID and the aspect ratio information is shown.

TABLE 1

| Word 0 | | |
|---|---|---|
| Bit 1 | Bit 2 | Details |
| 0 | 0 | Image signal of aspect ratio 4:3, or no information |
| 1 | 0 | Image squeeze signal of aspect ratio 16:9 |
| 0 | 1 | Letterbox signal of aspect ratio 4:3 |
| 1 | 1 | Not used here |

Figure 2:
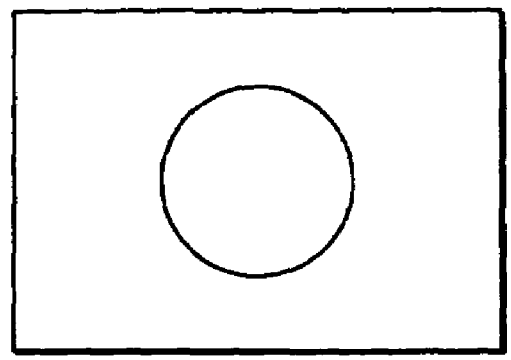
FIG. 2 is a diagram showing one example of aspect ratio conversion and video combination.
Figure 3:
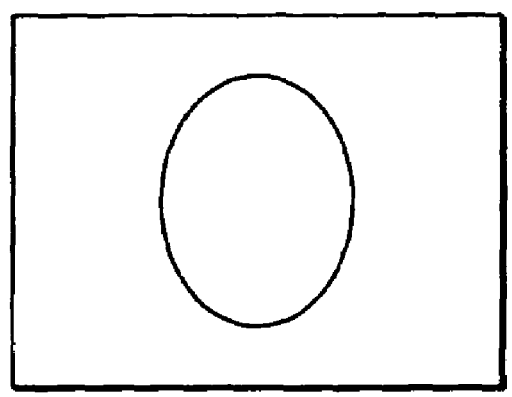
FIG. 3 is a diagram showing another example of aspect ratio conversion and video combination.
Figure 4:
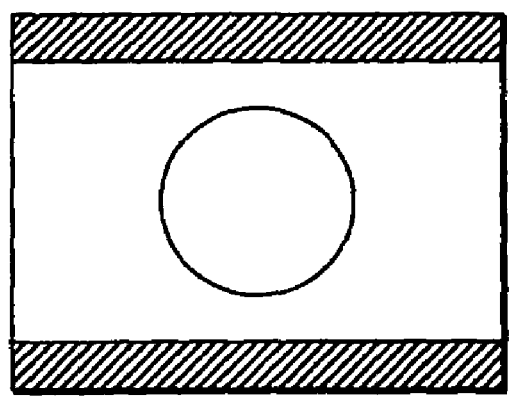
FIG. 4 is a diagram showing still another example of aspect ratio conversion and video combination.

When the video ID is 00, there is no image signal nor information having the aspect ratio of 4:3, and if this is the case, the aspect ratio converter 3 outputs a video signal with roundness kept at 1 (refer to FIG. 2). Moreover, the video ID 10 is a squeeze signal indicating squeezing of an image derived by embedding an image of the aspect ratio of 16:9 in an image having the aspect ratio of 4:3. Accordingly, the aspect ratio converter 3 must return the aspect ratio to 16:9 (refer to FIG. 3). Further, when the video ID is 01, it is a letterbox signal having the aspect ratio of 4:3, and if this is the case, the aspect ratio converter 3 outputs a video signal with the roundness kept at 1, and the video synthesizer 5 performs addition of a background signal (refer to FIG. 4).

Note here that other than using as a basis the information superimposed on an input signal such as a video ID to perform automatic setting of any target aspect ratio, the aspect ratio converter 3 may change the aspect ratio using a fixed scaling factor which is set without referring to an input signal.

The recorder 6 is provided with a slot (not shown) for loading a removable recording medium, and is allows writing access to the thus-loaded recording medium. In the present embodiment, the recorder 6 converts a video signal to be generated by the video synthesizer 5 into a specifically pre-determined signal format for recording onto a given recording medium. The recording medium herein may be small-sized and light-weighted memory devices such as memory sticks that are compatible with portable devices, or recording media such as tapes and disks.

[addenda]

As such, the invention has been described in detail by referring to a specific embodiment. However, it is understood that numerous other modifications and variations can be devised by those in the art without departing from the scope of the present invention. That is, the present invention has been disclosed by way of example, and the foregoing description is in all aspects illustrative and not restrictive. To understand the outline of the present invention, the range of the Claims must be taken into consideration.

The invention claimed is:

1. An image processor for processing a video signal, comprising:

aspect ratio information acquisition means for acquiring aspect ratio information about an original video signal by detecting a video identification signal that has been superimposed on the original video signal, wherein the acquired aspect ratio information is a two-bit code indicating a process of aspect ratio conversion on the original video signal;

aspect ratio conversion means for carrying out the process of aspect ratio conversion on the original video signal based on the acquired aspect ratio information to generate a processed video signal representing an image of the original video signal having a roundness of 1, wherein the aspect ratio conversion means has an operation mode in which the aspect ratio of the original video signal is changed automatically based on information about the original video signal, and an operation mode in which the aspect ratio of the original video signal is changed using a fixed scaling factor determined without referring to the original video signal;

background signal generation means for generating a background video signal serving as a background of the processed video signal; and video signal combination means for executing a process of combining the processed video signal and the background video signal, both having been subjected to aspect ratio conversion, to generate a synthesized video signal.

2. The image processor according to claim 1, wherein the aspect ratio conversion means changes the aspect ratio of the original video signal by pixel number conversion.

3. The image processor according to claim 1, wherein the aspect ratio conversion means changes the aspect ratio of the original video signal in such a manner that the image has roundness of 1, and has the maximum size fitting in a selected screen.

4. The image processor according to claim 1, wherein the background signal generation means performs signal generation using a same signal format as that of the processed video signal generated by the aspect ratio conversion means, the generated background comprising images derived from at least one of a program filling in a rectangular region, images created in the bitmap format, and the JPEG (Joint Picture Experts Group) format.

5. The image processor according to claim 1, wherein the video signal combination means determines a size of the video signal.

6. The image processor according to claim 1, further comprising:

recording means for recording the synthesized video signal onto a removable recording medium.

7. The image processor according to claim 6, wherein the aspect ratio conversion means carries out aspect ratio conversion with respect to the original video signal in such a manner that the image recorded by an external device with the removable recording medium loaded therein has roundness of 1 and has the maximum size fitting in a particular screen reproducing the synthesized video signal.

8. The image processor according to claim 6, wherein the background signal generation means generates a background signal of a same size as a screen that is selected for reproducing the synthesized video signal recorded on the removable recording medium in the external device, or a size needed for combination of video images.

9. The image processor according to claim 6, wherein when the image after conversion by the aspect ratio conversion means has an aspect ratio different from a preset aspect ratio at the time of recording, the video signal combination means adds the background video signal around the processed video signal to generate an image of the preset aspect ratio.

10. An image processing method for processing a video signal, comprising:
- an aspect ratio information acquisition step of acquiring aspect ratio information about an original video signal by detecting a video identification signal that has been superimposed on the original video signal, wherein the acquired aspect ratio information is a two-bit code indicating a process of aspect ratio conversion on the original video signal;
- an aspect ratio conversion step of carrying out the process of aspect ratio conversion on the original video signal based on the acquired aspect ratio information to generate a processed signal representing an image of the original video signal having a roundness of 1, wherein the process of aspect ratio conversion includes an operation mode in which the aspect ratio of the original video signal is changed automatically based on information about the original video signal, and an operation mode in which the aspect ratio of the original video signal is changed using a fixed scaling factor determined without referring to the original video signal;
- a background signal generation step of generating a background video signal serving as a background of the processed video signal; and
- a video signal combination step of combining the processed video signal and the background video signal, both having been subjected to aspect ratio conversion, to generate a synthesized video signal.

11. The image processing method according to claim 10, further comprising
- a recording step of recording the synthesized video signal resulting from the signal combination onto a removable recording medium.

12. The image processing method according to claim 11, wherein
- the aspect ratio conversion step carries out the process of aspect ratio conversion with respect to the original video signal in such a manner that the image recorded in the removable medium in an external device has an roundness of 1 and has the maximum size fitting in a particular screen reproducing the synthesized video signal.

13. The image processing method according to claim 11, wherein
- the background signal generation step generates a background signal of a same size as the particular screen generating the synthesized video signal recorded on the removable recording medium in the external device, or a size needed for video image combination.

14. The image processing method according to claim 11, wherein
- in the video signal combination step, when at the time of recording the image after conversion has an aspect ratio different from a preset aspect ratio, the background video signal is added around the processed video signal to generate an image of the preset aspect ratio.

15. A computer program embedded on a computer-readable medium, the computer program configured to execute, on a computer system, a process of processing a video signal, comprising:
- an aspect ratio information acquisition step of acquiring aspect ratio information about an original video signal by detecting a video identification signal that has been superimposed on the original video signal, wherein the acquired aspect ratio information is a two-bit code indicating a process of aspect ratio conversion on the original video signal;
- an aspect ratio conversion step of carrying out the process of aspect ratio conversion on the original video signal based on the acquired aspect ratio information to generate a processed video signal representing an image of the original video signal having a roundness of 1, wherein the process of aspect ratio conversion means includes an operation mode in which the aspect ratio of the original video signal is changed automatically based on information about the original video signal, and an operation mode in which the aspect ratio of the original video signal is changed using a fixed scaling factor determined without referring to the original video signal;
- a background signal generation step of generating a background video signal serving as a background of the processed video signal; and
- a video signal combination step of combining the processed video signal and the background video signal, both having been subjected to aspect ratio conversion, to generate a synthesized video signal.

16. The image processing method of claim 10, wherein the first bit of the two-bit code is used to indicate whether the original video signal represents a signal having a 16:9 aspect ratio embedded in a signal having an aspect ratio of 4:3.

* * * * *